United States Patent [19]
Tosswil

[11] 3,752,987
[45] Aug. 14, 1973

[54] SYSTEM FOR DETECTING HIGH ENERGY ELECTROMAGNETIC RADIATION

[75] Inventor: Christopher H. Tosswil, Ann Arbor, Mich.

[73] Assignee: The Bendix Corporation, Teterboro, N.J.

[22] Filed: Mar. 29, 1971

[21] Appl. No.: 129,082

[52] U.S. Cl................. 250/336, 250/207, 313/103
[51] Int. Cl. ............................................. G01t 1/16
[58] Field of Search ..................... 250/49.5 E, 83 R, 250/83.3 R, 207; 313/103, 104, 105

[56] References Cited
UNITED STATES PATENTS
| | | | |
|---|---|---|---|
| 3,609,353 | 9/1971 | White | 250/83.3 |
| 2,814,730 | 11/1957 | Fechter | 250/83.3 |
| 3,197,637 | 7/1965 | Kronenberg | 250/83.3 |

*Primary Examiner*—James W. Lawrence
*Assistant Examiner*—D. C. Nelms
*Attorney*—Lester L. Hallacher

[57] ABSTRACT

An array comprising a large number of thin walled electron multiplying passageways is disposed in a housing having windows disposed so that high energy or penetrating electromagnetic radiation passing through the windows strikes the side of the passageway array. The high energy radiation penetrates the passageway walls and undergoes interactions with the wall electrons and atoms in a statistically determinable manner. The array includes a sufficient number of passageways, and the passageway walls are sufficiently thin to provide a probability substantially of unity that high energy radiation striking the array will impart energy to electrons sufficiently close to the surface of a passageway wall to cause at least one electron to be emitted from a passageway wall. The array multiplies emitted electrons and provides an output pulse of a number of output electrons in response to each received high energy electromagnetic radiation signal. The array provides sufficiently large output pulses that will not be lost by apparatus for detecting and counting those pulses.

15 Claims, 4 Drawing Figures

PATENTED AUG 14 1973
3,752,987
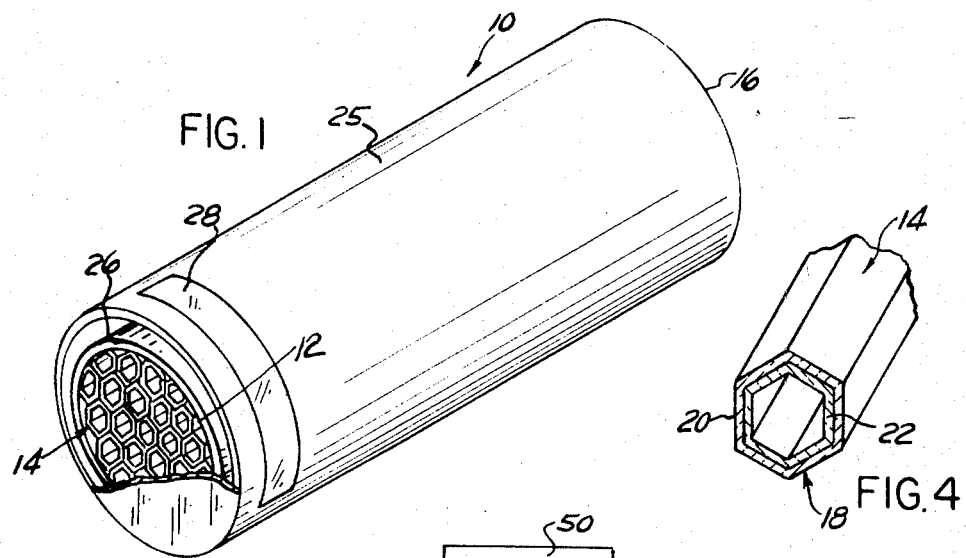
FIG. 1
FIG. 4
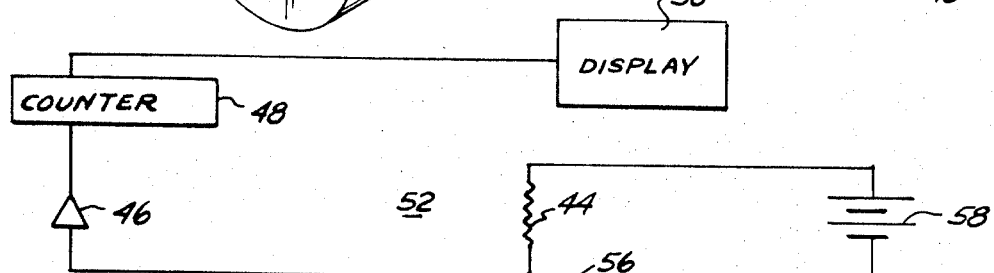
FIG. 2
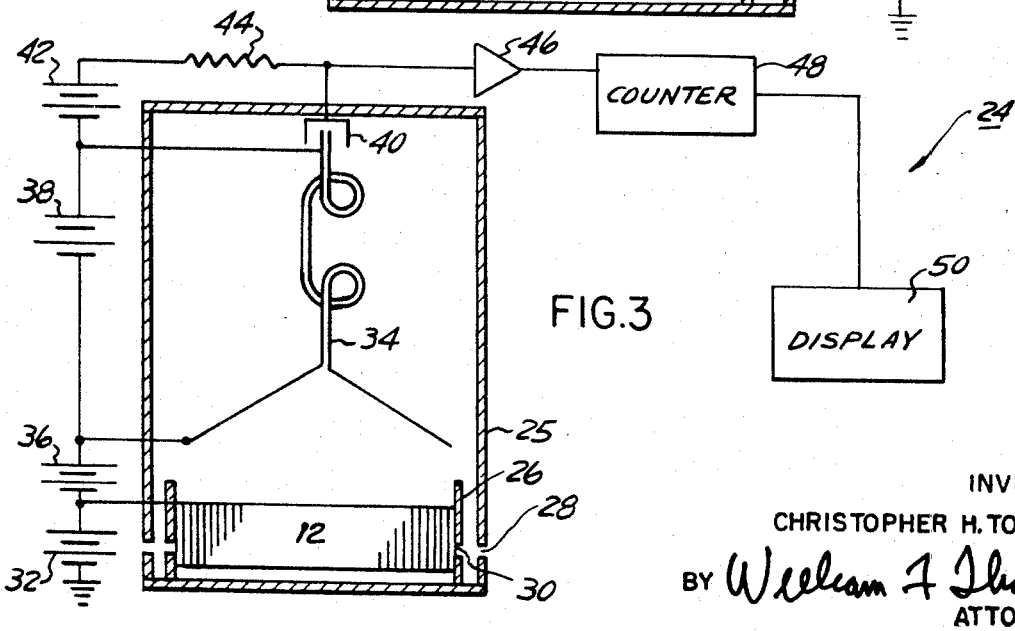
FIG. 3
INVENTOR
CHRISTOPHER H. TOSSWILL
BY William F. Thomas
ATTORNEY

SYSTEM FOR DETECTING HIGH ENERGY ELECTROMAGNETIC RADIATION

BACKGROUND OF THE INVENTION

1. Field of the Invention

The detection of high energy or penetrating electromagnetic radiation including intermediate energy x-rays, high energy x-rays, and gamma rays.

2. Brief Description of the Prior Art

Gas ionization chambers, scintillation counters, and semiconductor junction detectors are presently used to detect and count signal pulses of high energy electromagnetic radiation such as intermediate and higher energy x-radiation. In the first of these devices, radiation is directed through a gas filled chamber, the radiation interacts with and ionizes at least some of the gas molecules. The radiation also cause the emission of secondary radiation and electrons from the chamber walls as it passes through those walls. This secondary radiation and electrons cause secondary ionization of the gas. The gas ions are collected for measurement by an electrometer circuit which provides an output indicating that radiation has passed through the chamber. The absorption of high energy radiation or interaction between radiation and matter is largely a mass dependent process. Gas ionization chambers, therefore, are so bulky that they are inconvenient to work with. They are also slow.

Scintillation counters include a flour material such as anthracene or styrene, for receiving radiation and providing a light output signal in response to received radiation. This light signal is transmitted to a photocathode which produces an electron output signal. The electron signal is multiplied and then supplied to collecting and counting apparatus. Scintillation counters are relatively complicated in that they require two signal conversions in order to obtain a measurable output signal. That is, they require conversion of a radiation signal to a light signal and conversion of the light signal to an electron signal. In addition, photocathodes have a number of characteristics that are undesirable in devices such as this. For example, they may be easily harmed if they are not in a perfect vacuum. They are highly subject to radiation damage. And they are also difficult and expensive to construct.

In a semiconductor junction detector, radiation strikes the semiconductor material, is absorbed by that material, and causes a flow of electronic charge across the junction. This charge flow is measured by electronic measuring and counting apparatus. These devices operate only at very low temperatures, often below 100°K. They thus typically are maintained in a liquid nitrogen cooled chamber during operation. In addition, they provide output signals of relatively small amplitude that are in many cases hard to distinguish from noise signals.

SUMMARY OF THE INVENTION

The subject invention comprises a compact and efficient system for detecting high energy electromagnetic radiation, such as intermediate and high energy x-radiation and gamma radiation. X-radiation is generally defined to be that radiation defined by the energy range of 1 kilovolt to 250 kilovolts, and gamma radiation is defined to be that radiation having energies greater than 250 kilovolts. The system of this invention is to be used primarily to detect x-radiation having energies greater than 10 kilovolts and gamma radiation. The system includes an array of a relatively large number of thin walled multiplier channel passageway means. High energy electromagnetic radiation is directed to strike the side of the passageway array. Because of its high energy, the radiation penetrates the passageway walls. The radiation undergoes interactions with the electrons and atoms of the passageway walls and thus loses energy in a statistically determinable manner. That is, radiation striking a material will undergo interactions with various electrons and atoms of the material. The radiation loses energy in these interactions, and energy is imparted to the electrons which enables them to travel through the wall material. The number of interactions and the amount of energy that will be lost by the radiation can be determined statistically as a function of the mass of material through which the radiation penetrates. The passageway walls are constructed to be as thin as possible to maximize the probability that the electrons that have acquired energy from the electromagnetic radiation will not be captured by an atom of the passageway wall but will instead escape from those walls. Electrons emitted from the passageway walls are multiplied by the multiplier array and transmitted to electronic detecting and counting apparatus for providing an output signal indicating the fact that a pulse of radiation has been received. The multiplying array provides, in response to each received signal, an electrical output signal pulse having sufficient amplitude to insure that the pulse can be easily detected and counted with conventional electronic apparatus.

The multiplier array includes a sufficiently large number of passageways to provide a probability substantially of unity that electromagnetic radiation received by the array will cause at least one electron to be emitted from the passageway walls and provide a signal for the detecting and counting apparatus. The concept of a probability of unity is a common concept in the scientific community. This concept as applied to the subject invention is explained as follows. If a large number such as one million different x-rays are made to strike a wall or membrane at different times and the wall emits one thousand electrons in response to the one million x-rays, or in other words one electron for each one thousand x-rays, the probability that one x-ray striking the wall or membrane will produce an electron is one in one thousand. Therefore, if one thousand different membranes are provided and the x-ray has sufficient energy to penetrate all one thousand membranes, there is a probability of unity that the x-ray will produce an electron. If nine hundred different membranes are provided and the x-ray has sufficient energy to penetrate these nine hundred membranes, there will be a probability substantially of unity, namely ninety percent of unity, that the x-ray will cause the emission of an electron. The passageway array of the subject invention thus includes a sufficient number of individual passageways having sufficiently thin passageway walls to provide an electron emission probability substantially of unity to thereby insure that the radiation signals received by the array will be detected and will not be lost. The array may include enough passageways to provide a probability that more than one electron will be emitted from the passageway walls and no ambiguous or confusing signals will be provided by the array. Such an array will merely provide a stronger ouput signal in response to received radiation than will an array providing a probability that only one electron will be emitted.

BRIEF DESCRIPTION OF THE DRAWINGS

Further objects, features and advantages of the subject invention, which is defined by the appended claims, will become apparent from a consideration of the following description and accompanying drawings in which:

FIG. 1 is a schematic, partially cutaway, perspective view of a high energy radiation detecting passageway multiplier array disposed in an evacuative housing;

FIG. 2 is a three-dimensional, perspective view of one of the passageways of the array shown in FIG. 1;

FIG. 3 is a schematic circuit diagram of a high energy radiation detector that includes the apparatus illustrated in FIG. 1; and FIG. 4 is a schematic circuit diagram of another high energy radiation detector.

DETAILED DESCRIPTION OF THE DRAWINGS

FIG. 1 illustrates a radiation detecting system 10 that includes an array 12 of straight multiplier tubes or channels 14 disposed in an evacuative housing 16. The detecting system 10 is desinged to detect high energy electromagnetic radiation capable of penetrating a mass of solid material. The walls 18 of each tube 14 of the array 12 are made as thin as possible in order to minimize the distance between each atom of the material forming that array and the surface of that wall. This maximizes the probability that an electron receiving energy during an interaction with high energy electromagnetic radiation will escape from the tube walls and will not be captured by a wall atom. The walls 18 of each tube of the array 12 must be formed from a good electron emitting material. That is, from a material having a high atomic number so that received electromagnetic radiation will undergo a large number of interactions with the electrons and atoms of the material and impart energy to a large number of electrons. Multiplying tubes having a wall thickness between 1 and 10 microns can readily be formed from such a material. However, an array formed from such a material having walls substantially thinner than 1 micron will be so weak as to be not structurally rigid. Therefore, in order to further maximize the probability that electrons will be emitted from the channel walls, as is best seen in FIG. 2, each tube 14 comprises a support layer 20 which has a thickness of about 1 micron and is formed from soda-lime glass and an emitting layer 22 of lead glass that has a thickness of about 0.2 microns. Soda-lime glass has a low atomic number and is thus highly transparent to high energy electromagnetic radiation. Lead glass has a high atomic number and thus also a high absorption coefficient for high energy electromagnetic radiation. In fact, the absorption coefficient for the lead glass is so much larger than that for the soda-lime glass that the thin lead glass layer will absorb a much larger portion of eht electromagnetic radiation than will the thicker soda-lime layer. This multilayer design thus maximizes the probability that the high energy electromagnetic radiation will impart energy to electrons that are very near the surface of a channel walls. These electrons from the lead glass layer are much more easily able to escape from the glass material into the channel than are electrons in the soda-lime layer that may receive energy from the high energy electromagnetic radiation because electrons in the lead glass layer need travel only a very short distance to reach the surface of the walls and thus escape those walls. There is thus a low probability that these electrons will be captured by atoms of the lead glass material. The multilayer design thus provides an extremely high probability that electromagnetic radiation will cause an electron to be emitted from the channel walls. Arrays of multilayer channels are rigid, durable, and effective radiation detectors.

Each array includes a sufficient number of tubes to provide a probability substantially of unity that radiation received by the array will cause an electron to be emitted from the tube walls and subsequently multiplied by the multiplying array 12. The multiplied electron signal is detected and counted or recorded by the electronic apparatus 24 illustrated in FIG. 3. The appropriate number of tubes, or in other words, the appropriate mass of wall material that must be provided for detecting radiation of any particular energy may be either calculated or determined experimentally. Radiation loses energy in an interaction with electrons and atoms. The quantity of matter necessary to insure that radiation will undergo a particular number of interactions and thus lose a particular amount of energy can be calculated using the equations provided by the theory of photoelectric emission for radiation having energies less than about 250 kilovolts and using the equations provided by the theory of Compton scattering for radiation having energies greater than about 250 kilovolts. It has been found that the efficiency of the detecting system is maximized when each tube wall is made as thin as possible, and the array includes enough channls to absorb a very large proportion of the energy of incident radiation. That is, it is generally desirable to have a sufficient number of channels to absorb all but $1/e^2$ (where $e = 2.7$) of the energy of received radiation. A large number of tubes is required to provide this absorption. For example, an array having approximately one thousand of the multilayer channels illustrated in FIG. 2 with each layer having a thickness as described above is an effective detector for radiation having approximately 50 kilovolts energy.

The housing 16 is formed from a material such as lead that is substantially opaque to the electromagnetic radiation. Housing 16 includes two layers 25 and 26 of lead or like material surrounding the multiplying array 12. Window means comprising collimating, slit-shaped windows 28 and 30 formed from a material such as nickel or beryllium that is transparent to this high energy radiation. As is best seen in FIG. 3, the windows 28 and 30 are arranged in series with each other to collimate radiation to insure that radiation will pass through the multiplying array 12 at a predetermined distance from the output of the array. The collimating windows thus insure that each radiation signal received by the detecting system 10 will cause the multiplying array 12 to provide a similar number of output electrons. The collimating slits or windows thus minimize the chance of the detecting system 10 providing an ambiguous output signal for which it is difficult to determine whether the signal is a noise signal or a signal indicating the receipt of high energy radiation.

Multiplying array 12 need not provide a particularly large output signal. It need only provide an output comprising a sufficient number of electrons so that the output can be further multiplied by subsequent multiplying apparatus, and will not be lost by that apparatus. In a typical embodiment, each electron emitted by received radiation will cause the array to provide a predetermined number between 100 and 1000 output electrons. In order to provide this output, electrons emitted from the walls of the array 12 are accelerated through that array and caused to generate secondary electrons by a potential on the order of 1000 volts maintained across the array by battery 32. The array 12 will have a length between 2 and 3 mm. Collimating windows 28 and 30 direct radiation to strike the back half of the array. The output electrons from array 12 generated by a particular received radiation signal are accelerated from that array to a helical electron multiplier 34 having a funnel-shaped input for collecting output electrons from across the entire output end of array 12. The electrons are accelerated toward multiplier 34 by a potential of approximately 500 volts maintained between that multiplier and array 12 by battery 36. Multiplier 34 is constructed and maintained to provide a predetermined electron gain between $1 \times 10^5$ and $1 \times 10^6$. To accomplish this multiplication, a potential of about 1,500 volts is maintained across the helical multiplier 34 by battery 38. Multiplier 34 thus provides an output of about $1 \times 10^8$ electrons or 10 pico coulombs for each received signal from array 12. The multiplier 34 thus provides an output signal that can be readily measured using electronic measuring apparatus. This apparatus includes a collector 40 for collecting the output electron signal from multiplier 34. Collector 40 is maintained at a slightly higher potential, say 50 volts higher potential than is the output of multiplier 34 so that electrons flow from multiplier 34 to collector 40. This higher potential is maintained on collector 40 by a battery 42 which is connected to that collector through a high resistance 44 on the order of 1,000,000 ohms. This large resistance is provided so that a relatively small current, namely the electrons received from collector 40, will provide a relative large voltage signal. Signals received by collector 40 are amplified by an electronic amplifying device 46 and supplied to a conventional counter 48. This counter records the number of signals received over a time period and supplies that number to a display 50.

FIG. 4 illustrates a second embodiment of a radiation detecting device 52 that differs from the device 10 in that the array 12 of straight tubes is replaced by an array 54 of twisted or spiralled tubes. Spiralled multipliers are well known in the art and are described in a number of places including "Spiraltron Matrixes as Windowless Photon Detectors for Soft X-Ray and Extreme U.V.," IEEE Transactions on Nuclear Science, Volume NS-16, No. 1, February, 1969, pp. 376–380 by T. A. Somer and P. W. Graves. Spiralled multiplier tubes provide a higher stable electron gain than the straight channeled multipliers so that the multiplier 34 shown in FIG. 3 need not be used in the embodiment of FIG. 4. The number of tubes, the thickness of the individual tube walls, and the dimensions of the array 54 are comparable to those of array 12. A somewhat higher potential, on the order of 2,000 volts, is maintained across array 54 by a battery 57 than can be maintained across an array of straight tubes. This higher potential is one of the reasons that aray 54 provides a higher gain than does array 12. High energy electromagnetic radiation is directed to strike the back half of array 54. The electron gain of this array is such that it provides about $1 \times 10^6$ electrons for each electron emitted from a tube wall by received radiation. This is a sufficient output signal to be measured with conventional measuring apparatus. The output electrons from array 54 are thus collected by a collector plate 56 and measured by conventional measuring apparatus similar to that shown in FIG. 3. The one difference between this conventional measuring apparatus and the apparatus of FIG. 3 is that the signal received by collector 56 from array 54 is smaller than the signal received by collector 40 from multiplier 34. Battery 58, therefore, must maintain a higher potential difference between the output of array 54 and collector 56 than was the case for the corresponding apparatus in FIG. 3. Typically, this potential difference would be on the order of 500 volts.

Having thus described several embodiments of the invention, a number of modifications will occur to those skilled in the art. For example, the multiplying array of a detector need not comprise an array of closed coarse conduits such as the tubes shown in the embodiments illustrated herein. A multiplying array can be formed from a stack of flat membranes spaced from each other to provide passageways or openings between adjacent members. As was the case with the embodiments illustrated herein, the membranes may be of either single layer construction. Radiation would be directed or strike and penetrate the stack of membranes in such an embodiment.

Therefore, what is claimed is:

1. A device for detecting high energy electromagnetic radiation capable of penetrating a predetermined mass of material and interacting with the electrons of said material to provide said electrons with sufficient energy to escape from said material, comprising:
   an array of multiplier passageway means having walls formed of said material and arranged so that radiation impacts said walls and the material absorbs a portion of said radiation and transmits a portion of said radiation;
   said device including a sufficient number of said walls to provide an approximately unity probability that radiation impacting said walls will release at least one electron sufficiently close to the surface of one of said walls so that said one electron will enter one of said multiplier passageway means and produce an output from said device.

2. The device of claim 1 wherein the ratio of wall thickness to channel diameter is small.

3. The device of claim 1 wherein said walls have a maximum thickness of 10 microns.

4. The device of claim 1 in which said walls include a supporting layer of material transparent to said radiation and an electron emitting layer of material for absorbing said radiation and emitting electrons in response to said absorption.

5. The device of claim 4 wherein said electron emitting layer is maintained in a desired peripheral configuration by said supporting layer.

6. The device of claim 4 wherein said electron emitting layer has a maximum thickness less than the thicknes of said supporting layer.

7. The device of claim 4 in which said supporting layer has a thickness of approximately 1 micron, said emitting layer has a thickness of approximately 0.2 microns, and said electron emitting layer is formed from a secondary electron emitting material, said emitting layer of each passageway means thereby defining a multiplying path for said array.

8. The device of claim 1 in which said electron emitting material has a predetermined coefficient of absorption for said electromagnetic radiation, and said array includes a sufficient number of said walls to cause the energy of said electromagnetic radiation to be reduced by a factor of $1/e^2$ (where $e = 2.7$).

9. The device of claim 1 wherein the total mass of material forming said walls is sufficient to absorb substantially all radiation impacting said device.

10. The device of claim 1 further including window means for directing said electromagnetic radiation to strike a predetermined portion of said array, and electronic counting apparatus for receiving and counting said outputs to thereby indicate the number of high energy electromagnetic radiation signals received by said array.

11. The device of claim 10 in which said window means comprises a plurality of collimating slits transparent to said electromagnetic radiation arranged in series with each other and disposed on the side of said array.

12. The device of claim 10 in which said material is a secondary electron emitting material, said multiplier passageway means includes an output end, said device includes means for accelerating electrons toward said output end, and said window means directs said electromagnetic radiation to strike the side of said passageway at a predetermined distance from said output end, said distance being sufficient for an electron emitted from said walls to generate a predetermined number of secondary electrons.

13. The device of claim 1 in which said array includes at least 500 multiplier passageway means.

14. The device of claim 1 in which:
said array includes a plurality of straight electron multiplier tubes having an approximate length of 2 to 3 mm;
said material is a secondary electron emitting material;
said tubes have output ends; and said device includes:
means for maintaining a potential gradient of approximately 1,000 volts across said array to accelerate electrons toward said output ends; and
window means for directing said electromagnetic radiation to strike said tubes at a distance equal to at least approximately one-half the length of said tubes from said output ends to thereby enable an electron emitted by said electromagnetic radiation to generate a detectable number of secondary electrons.

15. The device of claim 1 in which said array comprises an array of spiralled electron multiplier tubes having an approximate length of 2 to 3 mm;
said material is a secondary electron emitting material; said tubes having output ends and said device includes:
means for maintaining an electric potential of approximately 2,000 volts across said array for accelerating electrons toward said output ends; and
window means for directing said electromagnetic radiation to strike said array at a distance of at least approximately one-half the length of said array from said output end to cause an electron emitted from said walls by said electromagnetic radiation to generate a measurable number of secondary electrons.

* * * * *